(12) United States Patent
Tan et al.

(10) Patent No.: US 6,254,795 B1
(45) Date of Patent: Jul. 3, 2001

(54) TEXTURE MEASURING METHOD OF A HARD DISK PLATE

(75) Inventors: An-Hung Tan, Ping-Chen; Chi-Chih Chen, Chu-Pei; Han-Ming Wang, Hsin-Chu, all of (TW)

(73) Assignee: Trace Storage Technology Corp., Hsin-Chu (TW)

( * ) Notice: Subject to any disclaimer, the term of this patent is extended or adjusted under 35 U.S.C. 154(b) by 0 days.

(21) Appl. No.: 09/264,010

(22) Filed: Mar. 8, 1999

(30) Foreign Application Priority Data

Mar. 11, 1998 (TW) .................................................. 87103527

(51) Int. Cl.⁷ ............................. B44C 1/22; C03C 15/00; C23F 1/00; B24B 49/00
(52) U.S. Cl. .................................. 216/84; 451/8; 451/59; 216/121.71
(58) Field of Search .................................. 216/59, 65, 84, 216/88; 219/121.71; 451/8, 59

(56) References Cited

U.S. PATENT DOCUMENTS 5,167,096 * 12/1992 Eltoukhy et al. ................ 51/281 SF
5,506,017 * 4/1996 Ranjan et al. ....................... 428/65.7
6,123,603 * 9/2000 Tada et al. .............................. 451/37

* cited by examiner

*Primary Examiner*—Randy Gulakowski
*Assistant Examiner*—Michael Kornakov
(74) *Attorney, Agent, or Firm*—Winston Hsu

(57) ABSTRACT

The present invention provides a texture measuring method of a hard disk plate. The method comprises performing a laser etching process to form a pinhole at each of a plurality of predetermined positions in a predetermined area on the hard disk plate, measuring the pinhole at each of the predetermined positions to obtain a first measurement value, performing a mechanical texturing process on the predetermined area of the hard disk plate to form circular textures on the predetermined area, and measuring the pinhole at each of the predetermined positions to obtain a second measurement value wherein the first and second measurement values are used to determine the extent of texturing performed on the predetermined area of the hard disk plate.

5 Claims, 7 Drawing Sheets

TEXTURE MEASURING METHOD OF A HARD DISK PLATE

BACKGROUND OF THE INVENTION

1. Field of the Invention

The invention relates to a hard disk plate, and more particularly, to a texture measuring method of a hard disk plate.

2. Description of the Prior Art

A typical hard disk plate is formed by elecrolessly plating a nickel and phosphorus layer on an aluminum baseboard. The surface of the nickel and phosphorus layer is ground to a roughness (Ra) of 8~15 Å followed by mechanical texturing to form circular textures on the surface with a roughness (Ra) of 20~40 Å. The final step of the process of forming the hard disk plate involves forming a sputtered base layer, a magnetic layer, a passivation layer and a lubricating layer of approximately 20 Å on the passivation layer.

The hard disk plate comprises a landing zone where a magnetic head may land and a data storage area for storing data. The landing zone has a great number of circular textures to reduce the contact surface between the magnetic head and the hard disk plate. This reduces stiction between them. The data storage area has a smaller number of circular textures so as to provide a better base for positioning the magnetic layer, facilitate operations of the magnetic head, remove oxide on the surface of the nickel and phosphorus layer, and remove scratches generated when grinding the nickel and phosphorus layer.

Removal of scratches is accomplished by mechanical texturing. The thicker the portion of the nickel and phosphorus layer removed, the more scratches will be removed. However, the removal of scratches will result in a rougher data storage area. This will cause problems in the operation of the magnetic head. There are many factors affecting the formation of the circular textures. They include the type of texturing tape, texturing slurry, and coolant, force imposed on the hard disk plate, speed of rotation of the hard disk plate, texturing time, and vibration frequency of the main axis of the hard disk plate. Thus, it is difficult to determine how to form the circular textures.

Currently, the formation of the circular textures is determined based on two numbers. The first number is the difference between the weight of the hard disk plate before and after the circular textures are formed. This value indicates the amount of the hard disk plate removed. The second number is the roughness of the surface of the hard disk plate. This can be directly measured with a measuring device.

The amount of hard disk plate removed is small making accurate measurement of the difference in weight before and after circular texture formation difficult. Moreover, the process is labor intensive as the hard disk plate must be washed and dried before each weighing. Furthermore, the amount of the hard disk plate removed over different areas of the hard disk plate cannot be accurately assessed using the current method. Thus, the flatness of the hard disk plate after forming the circular textures cannot be effectively determined.

SUMMARY OF THE INVENTION

It is therefore a primary objective of the present invention to provide a texture measuring method of a hard disk plate to solve the above mentioned problems.

Briefly, in a preferred embodiment, the present invention provides a texture measuring method of a hard disk plate comprising:

performing a laser etching process to form a pinhole at each of a plurality of predetermined positions in a predetermined area on the hard disk plate;

measuring the pinhole at each of the predetermined positions to obtain a first measurement value;

performing a mechanical texturing process on the predetermined area of the hard disk plate to form circular textures on the predetermined area; and measuring the pinhole at each of the predetermined positions to obtain a second measurement value wherein the first and second measurement values are used to determine the extent of texturing performed on the predetermined area of the hard disk plate.

It is an advantage of the present invention that the first and second measurement values are used to determine the extent of texturing performed on the predetermined area of the hard disk plate so that measuring the amount of the hard disk plate being removed takes less work, and the amount of the hard disk plate being removed over different parts of surface of the hard disk plate can be effectively determined.

These and other objects and the advantages of the present invention will no doubt become obvious to those of ordinary skill in the art after having read the following detailed description of the preferred embodiment that is illustrated in the various figures and drawings.

DETAILED DESCRIPTION OF THE PREFERRED EMBODIMENT

Figure 1:
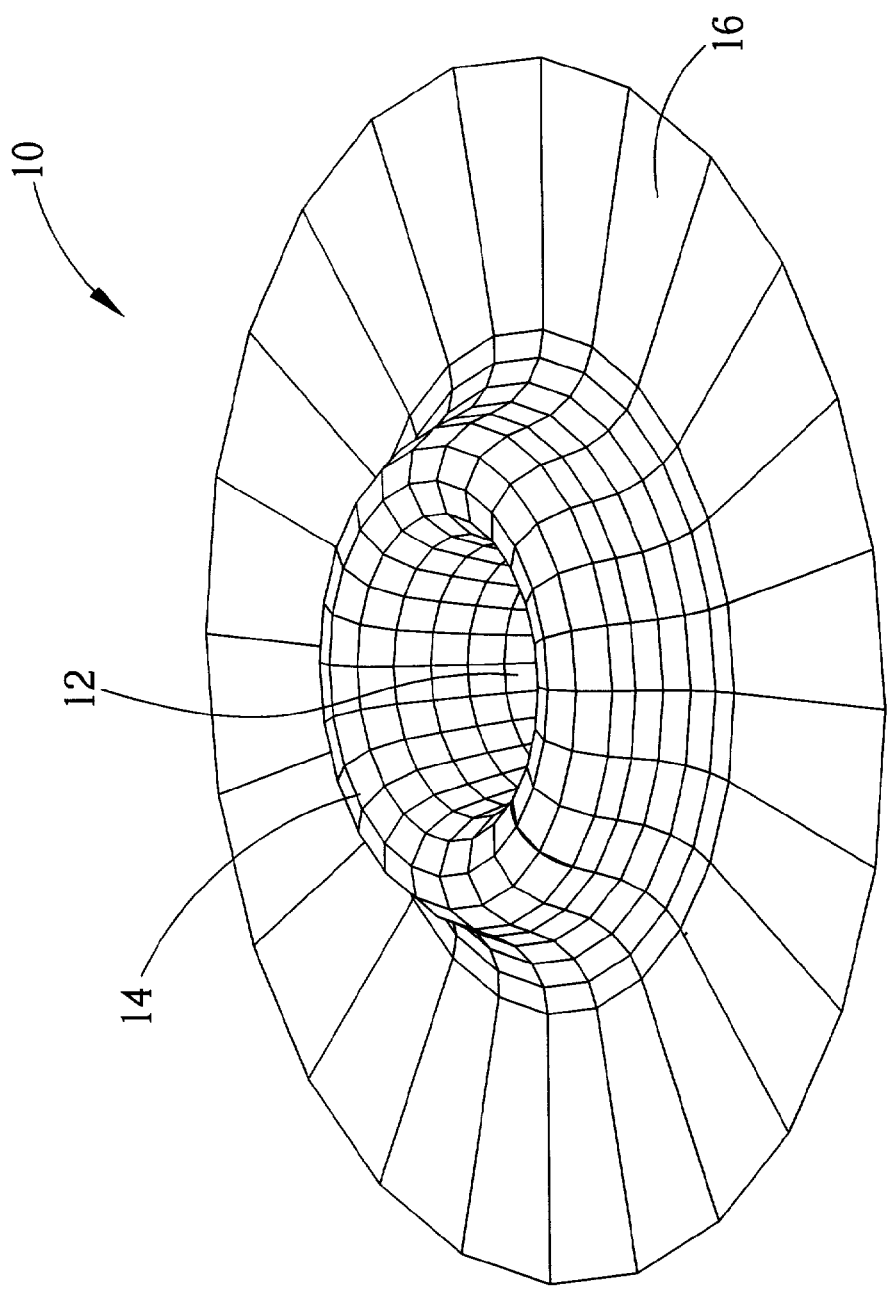
FIG. 1 is a perspective view of a pinhole on a hard disk plate detected by using an atomic force microscope (AFM).

The present invention provides a texture measuring method of a hard disk plate. The texturing measuring method is used to determine texturing parameters for texturing the hard disk plate. Please refer to FIG. 1. FIG. 1 is a perspective view of a pinhole 12 on a hard disk plate 10 detected by using an atomic force microscope (AFM). The pinhole 12 is formed by performing a laser etching process at each of a plurality of predetermined positions in a predetermined area 16 on the hard disk plate 10. The pinhole 12 comprises a circular collar 14 protruded over the surface of the predetermined area 16. The height of the circular collar 14 can be adjusted by controlling the power of a laser beam emitted during the laser etching process. The texturing parameters are determined according to the following steps:

Step 1: separating a plurality of hard disk plates with similar roughness such as superpolished plates, semi-polished plates or normally polished plates into groups A and B with each of the hard disk plates of group A being associated with a hard disk plate of group B.

Step 2: performing a laser etching process to form a pinhole at each of a plurality of predetermined positions in a predetermined area on each hard disk plate of group A and recording the height of a circular collar protruded over the surface of the hard disk plate around the pinhole to obtain a first measurement value. The predetermined positions should be all positions along a radial direction of the hard disk plate, preferably at least two sets of pinholes should be formed along different radial directions of the hard disk plate.

Step 3: performing a mechanical texturing process of the same texturing parameters on each associated pair of hard disk plates of groups A and B to form circular textures on the pair of hard disk plates.

Step 4: measuring the roughness of the surface of each hard disk plate of group B and recording the height of the circular collar again to obtain a second measurement value. The extent of texturing performed on the predetermined area is determined by calculating the difference of the first and second measurement values. Although the extent of texturing performed can also be determined by calculating the difference of the volume of the circular collar before and after performing the mechanical texturing process, the volume of the collar cannot be obtained as easily as the height.

Step 5: selecting the texturing parameters of a best pair of hard disk plates for texturing hard disk plates. The best pair is selected according to the roughness of the surface of each hard disk plate of group B and the extent of texturing performed on the associated hard disk plate of group A. The roughness of the surface of the selected hard disk plate of group B should be between 20 to 40 Å, and the associated hard disk plate of group A should have a high extent of texturing performed.

In step 2, pinholes are formed at various positions on a hard disk plate, thus the amount of the hard disk plate being removed over different parts of the surface of the hard disk plate can be effectively determined. In steps 2 and 4, and 2 and 4 each of the first and second measurement values can also be replaced by the depth of each pinhole below the surface of a hard disk plate of group A. This will provide a better measurement for determining the extent of texturing performed on the hard disk plate.

Figure 2:
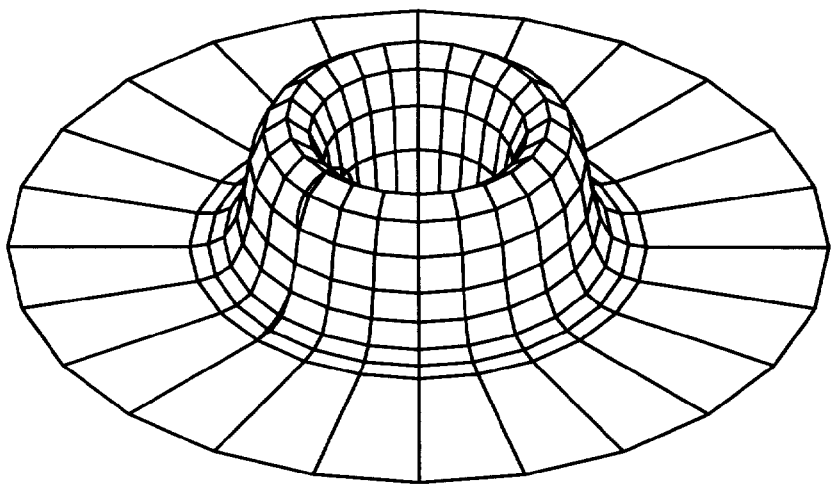
FIG. 2 is a perspective view of the pinhole in FIG. 1 detected by using the AFM after performing a mechanical texturing process.
Figure 3:
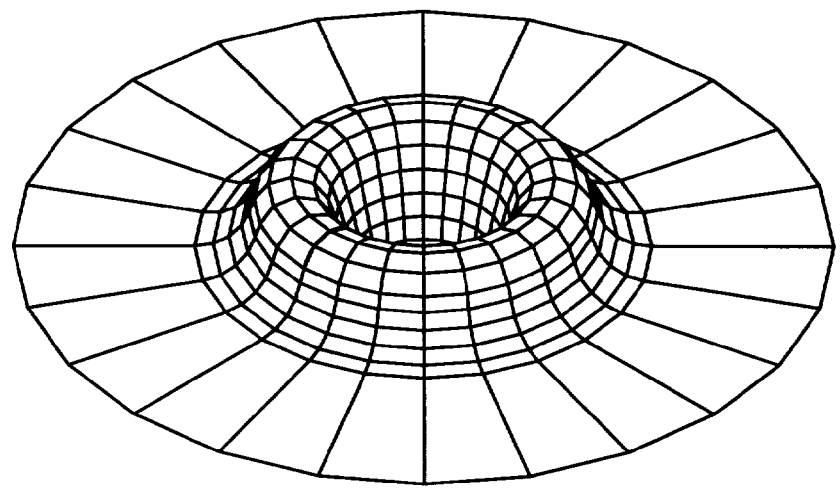
FIG. 3 is a perspective view of the pinhole in FIG. 1 detected by using the AFM after performing another mechanical texturing process.

Please refer to FIGS. 2 and 3. FIG. 2 is a perspective view of the pinhole 12 in FIG. 1 detected by using the AFM after performing a mechanical texturing process. FIG. 3 is a perspective view of the pinhole 12 detected by using the AFM after performing a different mechanical texturing process. FIGS. 2 and 3 show that the extent of texturing performed on the pinhole 12 in FIG. 3 is greater than that performed on the pinhole 12 in FIG. 2. The roughness of the surfaces of the hard disk plates in FIGS. 2 and 3 after performing the mechanical texturing process has to be detected by using their associated hard disk plates which have not undergone the laser etching process.

Figure 4:
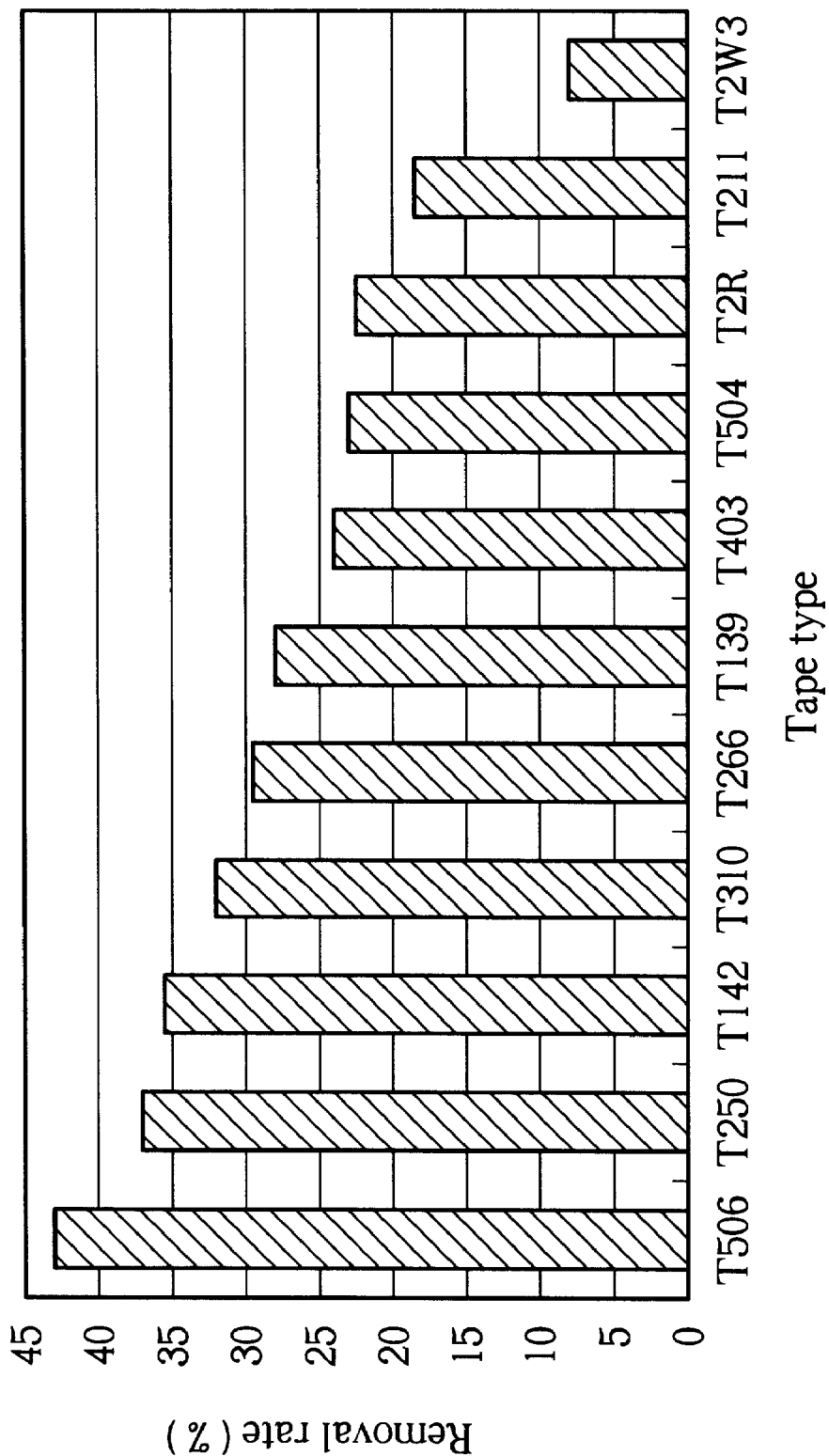
FIG. 4 shows rate of removal of the hard disk plate in FIG. 1 vs. type of tape used to perform a mechanical texturing process.
Figure 5:
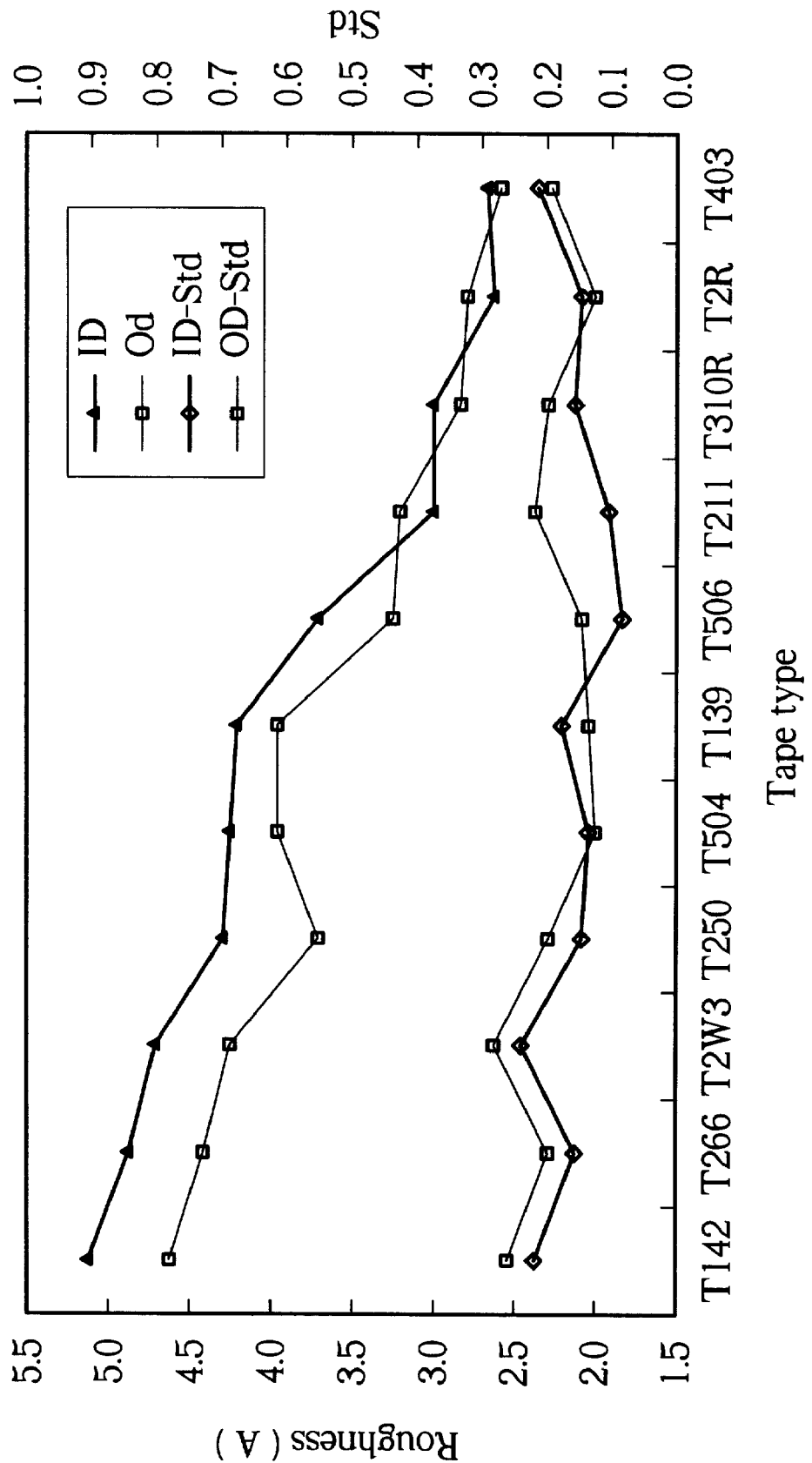
FIG. 5 shows roughness of the surface of the hard disk plate in FIG. 1 vs. type of tape used to perform the mechanical texturing process.

Please refer to FIGS. 4 and 5. FIG. 4 shows rate of removal of the hard disk plate 10 vs. type of tape used to perform a mechanical texturing process. FIG. 5 shows roughness of the surface of the hard disk plate 10 vs. type of tape used to perform the mechanical texturing process. FIG. 5 shows type T506, T211, T310, T2R and T403 of tape provide well defined roughness. FIG. 4 shows type T506, T250, T142 and T310 of tape provide the best rate of removal. Although tapes with a lower rate of removal can also be used to perform the texturing process, more time is required to remove oxide and scratches on the hard disk plate 10 when using these tapes.

Figure 6:
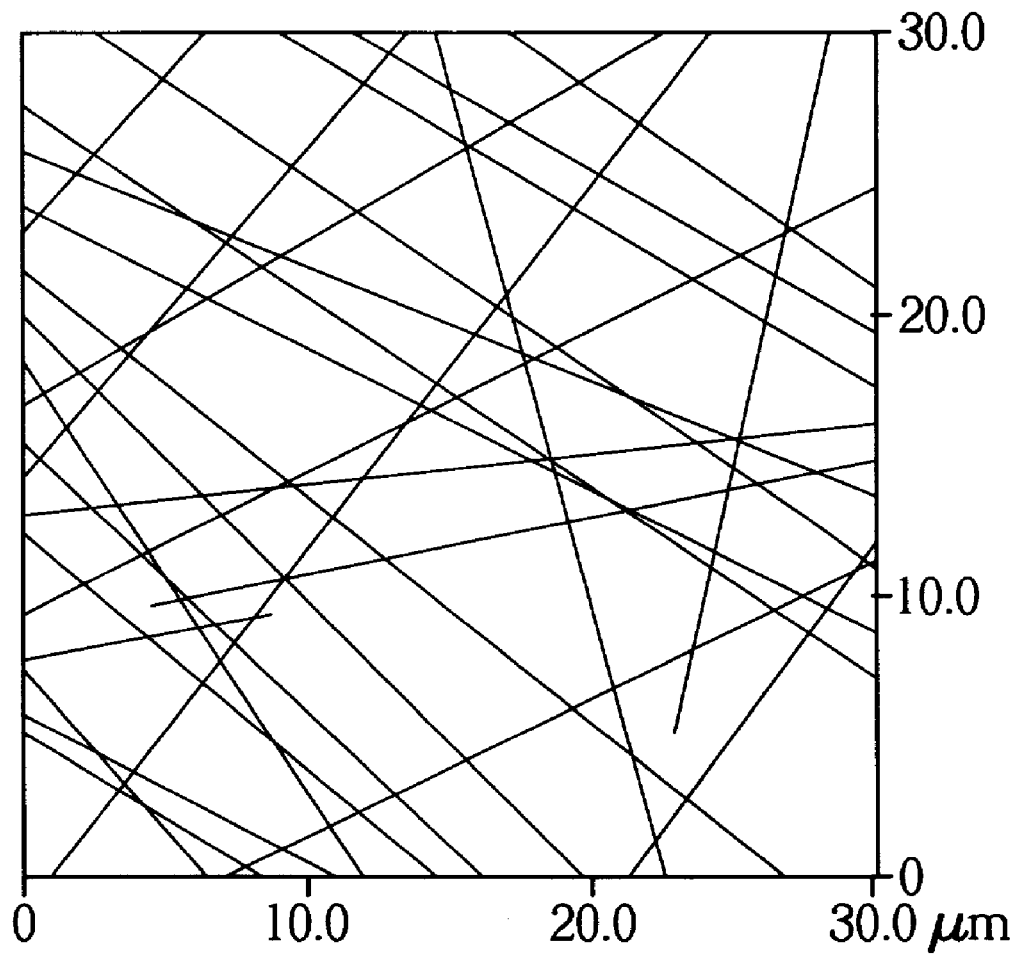
FIG. 6 shows original surfaces of different hard disk plates according to the present invention.
Figure 7:
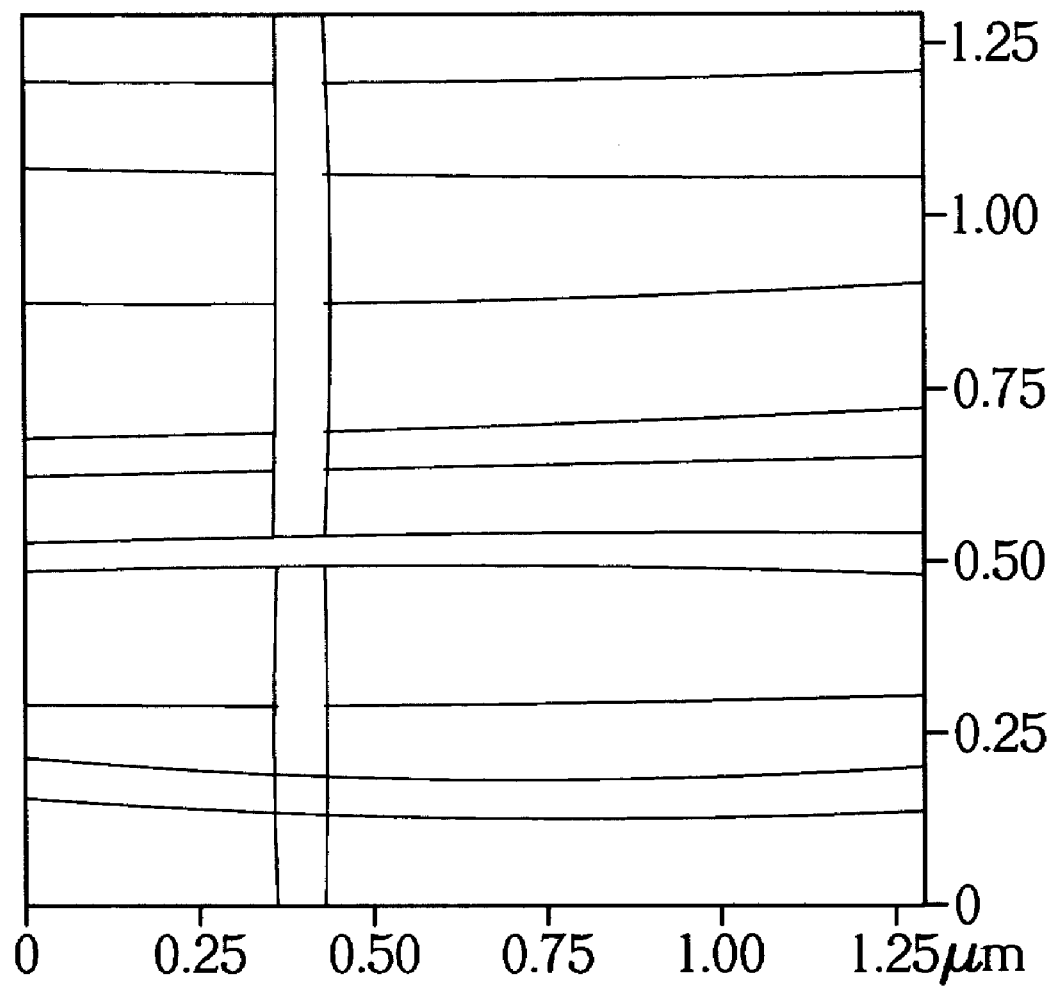
FIG. 7 are surfaces of the hard disk plates in FIG. 6 when the texturing process is performed by using tapes with a lower rate of removal.
Figure 8:
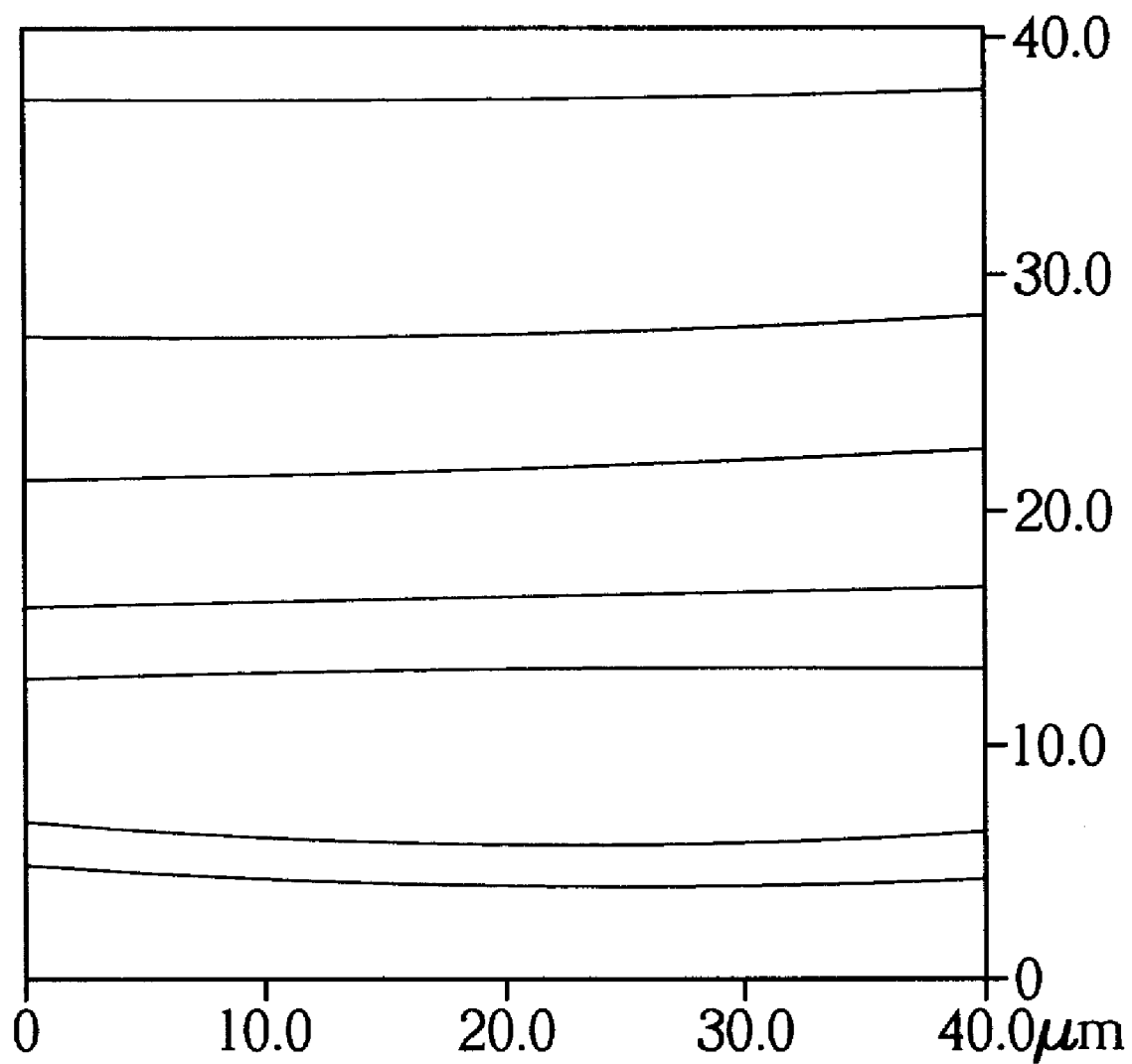
FIG. 8 are surfaces of the hard disk plates in FIG. 6 when selected tapes are used to perform the texturing process.

Please refer to FIGS. 6 to 8. FIG. 6 shows original surfaces of different hard disk plates, there are many scratches and defects on these surfaces. FIG. 7 shows surfaces of the hard disk plates in FIG. 6 when the texturing process is performed by using tapes with lower rate of removal. There are textures formed on these surfaces with part of the scratches and defects being removed. FIG. 8 are surfaces of the hard disk plates in FIG. 6 when selected tapes are used to perform the texturing process. It shows that all the scratches and defects are removed with many textures formed on these surfaces.

Compared with the prior art method, the first and second measurement values are used to determine the extent of texturing performed on the predetermined area 16 of the hard disk plate 10 so that measuring the amount of the hard disk plate 10 being removed takes less work, and the amount of the hard disk plate 10 being removed over different parts of the surface of the hard disk plate 10 can be effectively determined. When the amount of the hard disk plate 10 being removed over different parts of the surface of the hard disk plate 10 can be determined, the force imposed on the hard disk plate 10 for performing the texturing process can be effectively adjusted to improve the yield of the hard disk plate 10.

Those skilled in the art will readily observe that numerous modifications and alterations of the propeller may be made while retaining the teachings of the invention. Accordingly, the above disclosure should be construed as limited only by the metes and bounds of the appended claims.

What is claimed:

1. A texture measuring method of a hard disk plate comprising:

performing a laser etching process to form a pinhole at each of a plurality of predetermined positions in a predetermined area on the hard disk plate;

measuring the pinhole at each of the predetermined positions to obtain a first measurement value;

performing a mechanical texturing process on the predetermined area of the hard disk plate to form circular textures on the predetermined area; and measuring the pinhole at each of the predetermined positions to obtain a second measurement value to determine an extent of texturing performed on the predetermined area of the hard disk plate by the mechanical texturing process, the extent of texturing being related to a difference between the first measurement value and the second measurement value.

2. The method of claim 1 wherein the pinhole at each of the predetermined positions comprises a circular collar protruded over the surface of the predetermined area, and each of the first and second measurement values is the height of the collar above the surface of the predetermined area.

3. The method of claim 1 wherein the predetermined positions in the predetermined area are oriented along a radius of the hard disk plate for measuring the extent of texturing performed on the predetermined area along the radius of the hard disk plate.

4. The method of claim 1 wherein the hard disk plate comprises an aluminum baseboard and an overlying electroless-plated layer formed of nickel and phosphorus, and the mechanical texturing process is performed on the electroless plated layer of the hard disk plate to form the circular textures in the predetermined area.

5. The method of claim 1 wherein the hard disk plate comprises a landing zone for landing a magnetic head and a data storage area for storing data wherein the predetermined area can be the landing zone or the data storage area.

* * * * *